INVENTORS
EMMETT F. GLASS
JOHN K. HALE
RICHARD P. BERNHARDT
BY Walter V. Wright
AGENT

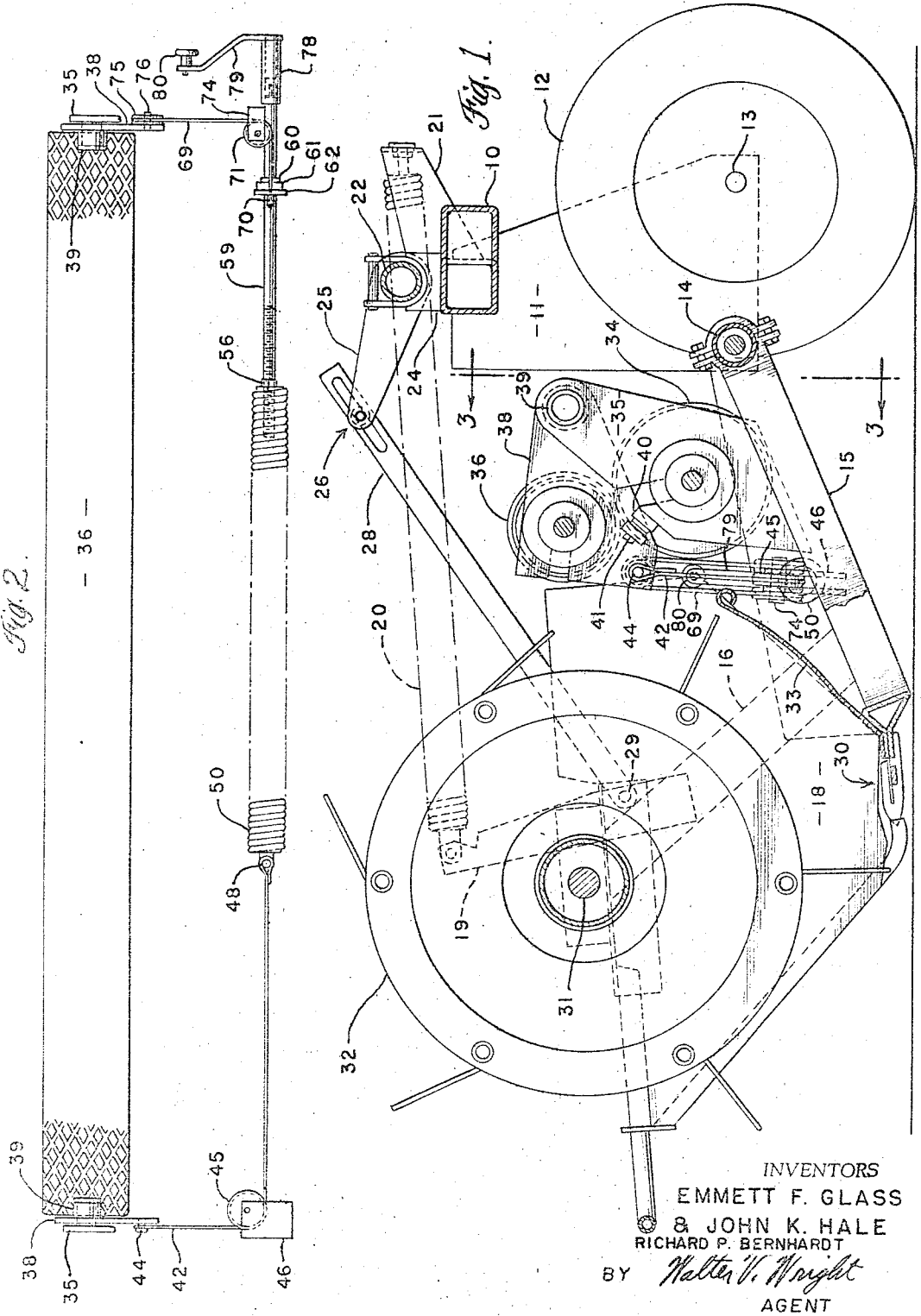

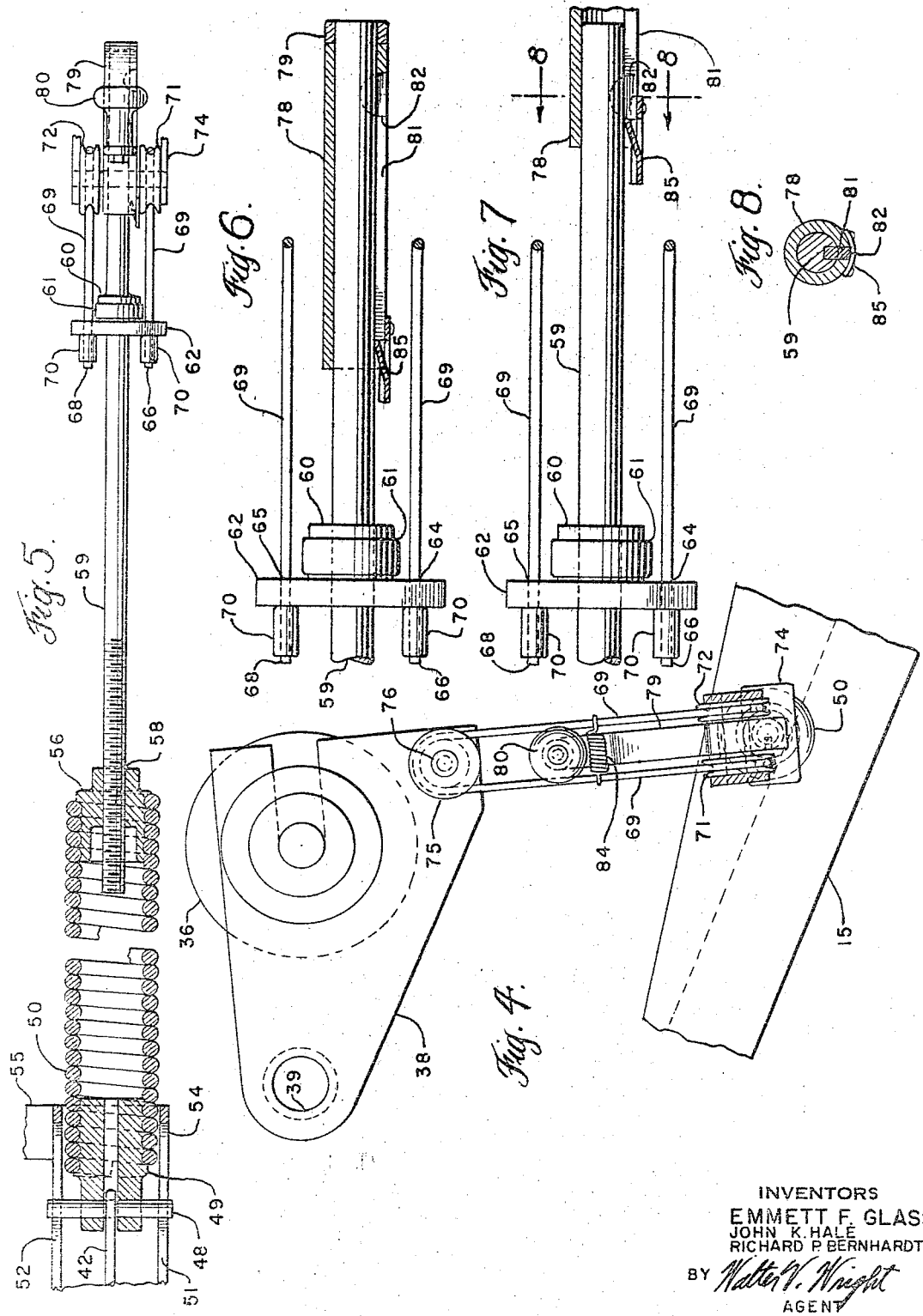

United States Patent Office 3,309,850
Patented Mar. 21, 1967

3,309,850
HAY HARVESTING MACHINE
Emmett F. Glass, Akron, and John K. Hale and Richard P. Bernhardt, New Holland, Pa., assignors to Sperry Rand Corporation, New Holland, Pa., a corporation of Delaware
Filed Jan. 5, 1965, Ser. No. 423,538
5 Claims. (Cl. 56—1)

This invention relates generally to the hay conditioning machines. It is particularly concerned with means for biasing a movable hay conditioning roll into engagement with a fixed hay conditioning roll.

After a crop of hay or the like is mowed, it is common practice to pass the crop between a pair of rolls which crack open the stems of the stalks to facilitate the escape of moisture and shorten the crop drying time. One of the rolls is journalled in a fixed position on the frame of the hay conditioning implement and the other roll is usually mounted for movement away from and back toward the first roll. In the event that any foreign objects or unusually large wads of crop material are carried between the rolls, they may separate momentarily to allow the object or wad to pass on through. Various arrangements of springs and linkages are used to bias the movable roll into engagement with the fixed roll to provide adequate roll pressure for conditioning. In most cases a separate spring is used at each end of the movable roll. In general, the known roll biasing arrangements are complex, rather expensive and usually difficult to adjust to vary the roll pressure in compensation for different crop conditions.

It is an object of this invention to provide mechanism for biasing a movable hay conditioning roll into engagement with a fixed hay conditioning roll which is of mechanically simple, low cost construction.

It is another object of this invention to provide movable hay conditioning roll biasing mechanism which is simple and easy to adjust in compensation for different crop conditions.

It is another object of this invention to provide movable hay conditioning roll biasing means which may be readily incorporated efficiently into the basic structure of the hay conditioning implement.

It is another object of this invention to provide hay conditioning roll biasing means employing a single long coil spring thereby affording a combination of adequate spring loading force for proper conditioning of a wide variety of crops and low spring rate for optimum roll separation action.

It is another object of this invention to provide hay conditioning roll biasing means employing a single long coil spring under tension thereby simplifying the mounting of the spring while providing predictable spring behaviour for easy spring adjustment to a fine degree.

These and other objects and advantages of this invention will be apparent upon reference to the following description and claims taken in conjunction with the accompanying drawings wherein:

FIG. 1 is a sectional elevational view of an agricultural implement having hay conditioning rolls which are spring loaded by mechanism constructed in accordance with the principles of the present invention;

FIG. 2 is a fragmentary view showing the upper conditioning roll and the spring loading mechanism as they would appear when viewed from behind the implement of FIG. 1 looking toward the front;

FIG. 4 is an enlarged fragmentary side view of the upper conditioning roll and spring biasing mechanism as seen from the side of the implement opposite that shown in FIG. 1;

FIG. 5 is an irregular sectional view taken on the line 5—5 of FIG. 3;

FIGS. 6 and 7 are enlarged detail showings of the two axial positions of the spring tension adjusting crank; and FIG. 8 is a sectional view taken on the line 8—8 of FIG. 7.

Figure 3:
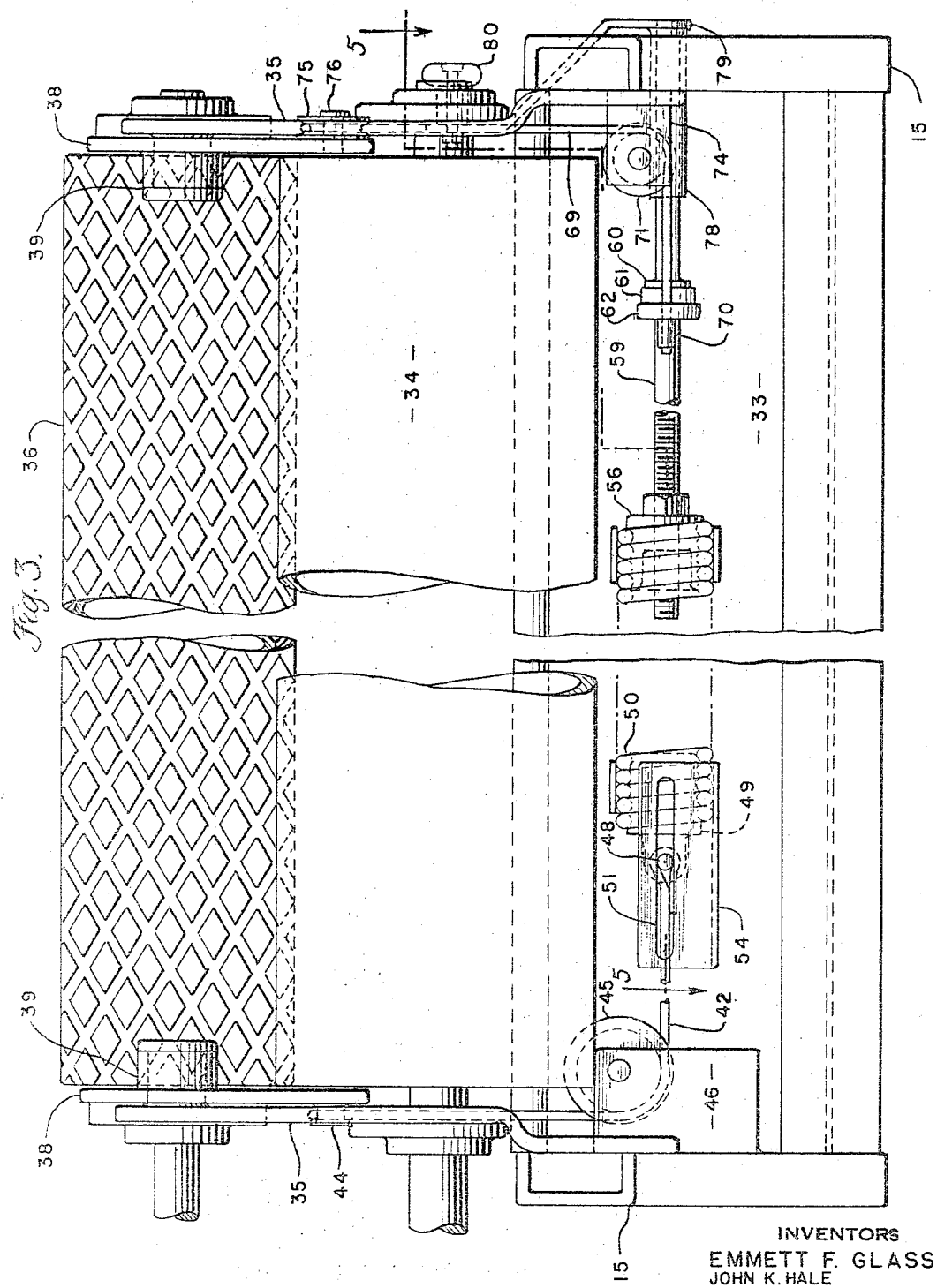
FIG. 3 is an enlarged fragmentary sectional view taken on the line 3—3 of FIG. 1.

Referring now to the drawings in detail, particularly to FIG. 1, the agricultural machine shown therein is intended to travel from right to left as seen in this figure. The reference numeral 10 indicates a main transverse frame member which extends across the full width of the machine at the rear thereof. At each side of the machine a main frame plate 11 is fixedly attached to frame member 10 and extends downwardly therefrom. Ground wheels 12 (one shown) are journalled on spindles 13 carried by the frame plates 11. Forwardly of spindles 13 sleeve journals 14 are fixed to the frame plates 11 of the outboard sides thereof. In FIG. 1, the frame plate 11 and ground wheel 12 nearest the viewer have been omitted to simplify the drawings. The sleeve journal 14 visible in FIG. 1 is the one disposed on the outboard side of the left main frame plate 11 relative to the direction of travel of the frame. A sub-frame structure is journalled for vertical swinging movement on horizontal sleeve journals 14. The sub-frame structure includes downwardly and forwardly inclined box frame members 15 at each side of the sub-frame having their rearmost ends journalled on the sleeve journals 14. On each side of the sub-frame at the forward end of the members 15, sub-frame members 16 are fixedly attached and extend upwardly and forwardly from the respective members 15. Sub-frame side plates 18 are fixedly attached to the frame members 15 and 16 at each side of the sub-frame. Also duplicated at each side of the sub-frame are upwardly extending stanchions 19 which form an integral part of the sub-frame. Fore-and-aft extending sub-frame counterbalancing springs 20 have their forward ends anchored on the stanchions 19 and their rearmost ends anchored in brackets 21 fixedly carried by transverse main frame member 10 at each end thereof. A lift shaft 22 extends across the machine above main frame member 10 and is journalled in brackets 24 carried by the main frame member 10. At each end of lift shaft 22 a forwardly extending lift arm 25 is provided. The arms 25 have pin and slot connections 26 with downwardly and forwardly inclined arms 28 whose forwardmost ends are pivoted at 29 to the sub-frame structure. With this arrangement the counterbalanced sub-frame is free to float and follow the ground contour by pivoting upwardly or downwardly about the sub-frame journals 14. The pin and slot connections 26 do not inhibit this floating action.

When it is desired to transport the implement between fields, or over the highways, the sub-frame structure may be raised about journals 14 to a transport position by rotation of lift shaft 22 in the clockwise direction as seen in FIG. 1. The first moves the pin of pin and slot connections 26 to the rearmost end of the slot and then raises the sub-frame structure via arm 28. The lift shaft 22 may readily be connected to the hydraulic system of the towing tractor to be oscillated thereby. Such connections are common place and do not constitute a part of the present invention.

In the agricultural machine shown in FIG. 1, a conventional mower 30 is carried by the sub-frame adjacent the ground and extends transversely relative to the direction of travel of the machine. Upwardly and forwardly from mower 30, adjacent the forwardmost ends of sub-frame members 16, the shaft 31 of a conventional crop gathering reel 32 is journalled. The reel is mounted to extend horizontally across the sub-frame parallel to mower 30. A crop guiding plate 33 extends across the sub-frame and reaches upwardly and rearwardly from mower 30 generally concentric to the axis of reel 32.

As seen in FIG. 1, the reel 32 normally rotates in a counterclockwise direction sweeping crop material rearwardly over mower 30 and upwardly along crop guiding plate 33 after it is cut by the mower. Behind crop guiding plate 33 in position to receive crop material swept upwardly therealong by reel 32, is a pair of hay conditioning rolls. The lower roll 34 of the pair of rolls extends horizontally and transversely across the sub-frame structure. Its respective ends are journalled in plates 35 fixedly carried by sub-frame members 15. The roll 34 is thus journalled in a fixed position on the sub-frame. An upper hay conditioning roll 36 is disposed above and slightly forwardly of lower roll 34. Upper roll 36 extends parallel to lower roll 34 and normally is in peripheral engagement therewith. The respective ends of upper roll 36 are journalled in plate-like arms 38 whose rearmost ends are, in turn, journalled on sleeve journals 39 for pivotal movement about an axis parallel to the axes of the conditioning rolls. The journals 39 are carried by lower roll supporting plates 35. Adjustable stop pads 40 and 41 are respectively carried by plates 35 and arms 38, as is well known in the hay conditioning art.

In FIG. 1 a cable 42 may be seen. It is looped over a pin-like member 44 carried by upper roll supporting arm 38 and extends downwardly therefrom. This is at the left end of the conditioning rolls relative to the direction of travel of the machine. Referring now to FIG. 2, it may be seen that cable 42 extends downwardly from pin 44 to a cable guide member 45 in the form of a pulley. Pulley 45 is journalled in a bracket 46 which is fixedly mounted on the sub-frame member 15 at the left side of the sub-frame. In FIG. 2 it may be seen that cable 42 extends laterally inwardly from pulley 45 and is anchored on a pin 48. Referring now also to FIG. 5 of the drawings, it may be seen that pin 48 is carried by a plug 49 which is threaded into the end of elongated transversely disposed coil spring 50. In this manner the plug 49 is fixedly attached to the coil spring. In FIGS. 5 and 3, it may be seen that pin 48 extends transversely relative to the axis of coil spring 50 and projects through slots 51 and 52 provided in a bracket 54. The slots 51 and 52 extend parallel to the axis of coil spring 50. An extension 55 (FIG. 5) of bracket 54 is fixedly attached to the sub-frame structure. The bracket 54 with its pin and slot connection 48, 51, 52 supports coil spring 50 and prevents rotation of the coil spring about its own axis while freeing the coil spring for movement in either direction along its own axis.

In FIG. 5 it may be seen that a plug 56 is threaded into the end of spring 50 opposite the end carrying plug 49. Plug 56 has an axial threaded bore 58 into which a threaded rod 59 is received. In FIGS. 5, 6 and 7 it may be seen that a stop collar 60 is fixedly attached to rod 59 in a position spaced from plug 56. On the inboard side of stop collar 60 a thrust bearing 61 is received on shaft 59. A bracket 62 is loosely carried by rod 59 on the inboard side of thrust bearing 61 and projects on diametrically opposite sides of the rod. Apertures 64 and 65 (FIGS. 6 and 7) extend through bracket 62 on diametrically opposite sides of rod 59. The numerals 66 and 68 identify the respective ends of a single cable 69. The cable ends 66 and 68 extend through apertures 64 and 65 in bracket 62 and carry cable stops 70 in abutting relation to the bracket 62. The cable 69 extends laterally outwardly from bracket 62 along diametrically opposite sides of rod 59 to a pair of pulleys 71 and 72 (FIG. 5) which are journalled in a bracket structure 74. Bracket 74 is fixedly carried by sub-frame member 15 at the right side of the sub-frame structure (see FIG. 4). From pulleys 71 and 72, cable 69 extends upwardly to, and has its midportion wrapped over, a pulley 75. Pulley 75 is journalled on a pin 76 which is carried by upper conditioning roll supporting plate-like arm 38 at the right end of the conditioning rolls. It will be appreciated from FIGS. 2, 4 and 5 that the effective length of cable 69 for purposes of spring loading upper conditioning roll 36, is from pulley 75 down to double pulley 71–72 and inwardly to plug 56 in the end of spring 50.

Slidably received on the right end of rod 59 is a sleeve 78. In FIG. 2 it may be seen that a crank arm 79 extends radially from the extreme outer end of sleeve 78 (see also FIG. 6). A crank handle 80 is journalled on the radially outer end of crank arm 79. Referring now to FIGS. 6, 7 and 8, it may be seen that sleeve 78 is provided with a longitudinally extending slot 81 into which fits a key 82 which is fixedly carried in rod 59. This arrangement allows the sleeve 78 and crank 79 to be carried in an axially retracted position on rod 59 as shown in FIGS. 3, 5 and 6. In this position the handle 80 lies between the two vertically extending reaches of cable 69. Since this is the normal position of crank 79, it may be desirable to provide some simple latch means to normally hold the crank in this axial position. An exemplary latch in the form of a small coil spring 84 is shown in FIG. 4. The spring may be hooked over the two vertical reaches of cable 69 on the outboard side of crank arm 79 to hold the crank in its axially retracted position. Upon release of clamping spring 84, the sleeve 78 and crank 79 may be moved to the axially extended operative position shown in FIGS. 2 and 7.

If desired, a stop clip as shown at 85 in FIGS. 6 and 7 may be attached to sleeve 78 in position to engage key 82 and prevent the sleeve from being pulled completely off rod 59.

With the crank in the axially extended position of FIGS. 2 and 7, it may be turned to rotate rod 59 via the key connection 82. Rotation of the rod in one direction will turn rod 59 into the threaded bore of plug 56 thereby reducing the effective length of cable 69 and stretching, or increasing the tension of, spring 50. Rotation of rod 59 in the opposite direction obviously has the opposite effect on spring 50. The slot and pin connection 48, 51 and 52 prevents the spring 50 from rotating about its own axis while allowing the spring and cables to shift in the direction of the spring axis to maintain equal tension on both cables and consequently on both ends of upper roll 36.

While it is not shown, drive mechanism of a conventional nature is provided to drive lower hay conditioning roll 34 clockwise as seen in FIG. 1 and upper conditioning roll 36 counterclockwise as seen in FIG. 1. Such drive mechanism is not a part of the present invention. As the reel 32 sweeps the cut crop material upwardly and rearwardly along guide plate 33, it passes into the bight of conditioning rolls 34 and 36. The rolls crack open the stems of the crop material and discharge the material rearwardly and upwardly whereupon the material drops back onto the ground for drying. The upper roll 36 is free to float upwardly away from lower roll 34 and back down to its normal position in engagement with roll 34 in the event that a large wad of crop material or a foreign object such as a stick or stone is fed into the bight of the rolls. Since coil spring 50 is connected in tension between the respective cables 42 and 69, it urges upper conditioning roll 36 downwardly into engagement with the roll 34. The cable guiding pulleys 45 and 71, 72 are mounted substantially in the vertical planes of swinging movement of the upper conditioning roll supporting arms 38. In the drawings, spring 50 is shown in its unloaded or relaxed position. In preparation for operation, the crank 79, 80, is turned to rotate rod 59 into the threaded bore of block 56 thereby stretching, or preloading, spring 50. This exerts equal tension on each of the upper conditioning roll mounting arms 38. An increase or decrease in the loading tension of spring 50 is automatically distributed evenly between the two ends of upper conditioning roll 36. The roll hold down pressure is adjusted to accommodate various crop conditions simply by rotation of crank 79.

The extreme mechanical simplicity and low cost of the roll loading arrangement of this invention will be readily apparent from the foregoing. None of the special spring mounting structure commonly seen in hay conditioners is required. In their place, a few pulleys and other conventional hardware items are employed. A single spring is employed in place of the two springs commonly seen on such devices. The disposition of the spring transversely of the machine enables a long spring of many coils to be used without the necessity of complicated spring mounting structure. The use of a long spring of many coils affords adequate total spring force along with a low spring rate. The low spring rate enables the upper roll to float readily, when necessary, without special linkage to amplify the force attempting to lift the roll in order to overcome the hold down spring. It also enables fine accurate adjustment of spring tension to be easily accomplished. In connection with the transverse disposition of the spring, the use of an arrangement wherein the spring may be employed under tension instead of compression between the two ends of the movable roll leads to several advantages. By mounting the spring in tension, it is virtually self supporting. The behaviour of the spring is predictable since the problem of buckling of the spring about its own axis is eliminated. This greatly simplifies the mounting and adjusting problems associated with the spring and reduces the overall cost of the mechanism. Mounting of the spring in tension also avoids the possibility of the spring being compressed solid by the passage of an unusually large object between the conditioning rolls.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A hay conditioning device comprising a mobile frame adapted to travel in a forward direction, a first hay conditioning roll journalled on said frame in a fixed position and extending transverse to the direction of travel, a second hay conditioning roll normally engaging said first roll and disposed above and parallel to said first roll, means mounting said second roll on said frame for rotation about its own axis and for vertical swinging movement upwardly out of engagement with said first roll, a single elongated coil tension spring supported on said frame parallel to said rolls and disposed below said second roll, first and second guide means mounted on said frame respectively below the ends of said second roll, first and second flexible members respectively connected to the ends of said coil spring and to said second roll mounting means adjacent the ends of said second roll, said first and second flexible members extending downwardly from said roll mounting means respectively to said first and second guide means and then laterally inwardly toward the ends of said spring whereby the tension of said spring on said flexible members biases said second roll downwardly into engagement with said first roll, and selectively operable means for varying the tension of said spring to vary the biasing force on said second roll.

2. A hay conditioning device as recited in claim 1 wherein said means for varying the tension of said spring comprises a member fixedly attached to one end of said coil spring and having a threaded bore, an externally threaded rod received in said threaded bore, one of said flexible members being interconnected between said rod and said second roll mounting means, and crank means on said rod for rotating the rod in one direction to turn the rod into said threaded bore and reduce the effective length of said one flexible member thereby increasing the spring tension and for rotating the rod in the opposite direction to turn the rod out of said threaded bore and increase the effective length of said flexible member thereby reducing the spring tension.

3. A hay conditioning device as recited in claim 2 wherein said threaded rod is disposed in coaxial relation with said coil spring, one of said guide means comprising a pair of pulleys disposed along diametrically opposite sides of said rod, means anchoring both ends of said one of said flexible members to said rod respectively on diametrically opposite sides of the rod, said flexible member having reaches extending along opposite sides of said rod respectively to said pair of pulleys and then upwardly to said second roll mounting means, and a pulley mounted on said second roll mounting means over which the midportion of said flexible member is wrapped.

4. A hay conditioning device as recited in claim 2 wherein a second member is fixedly attached to said coil spring at the end thereof opposite said one end and projects axially beyond said opposite end of said spring, a pin fixedly carried by said second member and extending perpendicular to the axis of said coil spring, a bracket fixed on said frame and having elongated slots extending parallel to said spring axis, said pin extending transversely through said slots thereby preventing said spring from rotating about its own axis without preventing movement of said spring in directions parallel to said spring axis.

5. A hay conditioning device comprising a mobile frame adapted to travel over the ground in a forward direction, a first hay conditioning roll journalled on said frame in a fixed position with the axis of the roll horizontal and transverse to the direction of travel of said frame, a pair of arms, one of said arms being disposed adjacent one end of said first roll and the other arm being disposed adjacent the other end of said first roll, a second hay conditioning roll normally engaging said first roll and extending between said pair of arms with its axis parallel to said first roll axis, means journalling the ends of said second roll respectively on said arms, means mounting each of said arms on said frame for pivotal movement in a vertical plane thereby mounting said second roll for swinging movement away from and back toward said first roll, cable guides mounted on said frame adjacent each end of said first roll and disposed substantially in the respective planes of movement of said arms, said arms and said cable guides being disposed generally on the opposite sides of the axis of said first roll, flexible cables connected to said arms and extending therefrom to the respective cable guides, said cables extending from the respective cable guides toward each other, and a coil spring connected under tension between said cables thereby urging said second roll into engagement with said first roll.

References Cited by the Examiner

UNITED STATES PATENTS 2,921,426  1/1960  Heth _____ 56—1
2,958,991  11/1960  Heth _____ 56—1

ABRAHAM G. STONE, *Primary Examiner.*

ANTONIO F. GUIDA, *Examiner.*